United States Patent
Osaki

(10) Patent No.: US 12,155,803 B2
(45) Date of Patent: Nov. 26, 2024

(54) IMAGE TRANSMISSION APPARATUS TRANSMITTING IMAGE DATA WHEN NUMERIC KEY AND SPECIFIC KEY ARE OPERATED

(71) Applicant: BROTHER KOGYO KABUSHIKI KAISHA, Nagoya (JP)

(72) Inventor: Masayoshi Osaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/938,064

(22) Filed: Oct. 5, 2022

(65) Prior Publication Data

US 2023/0133742 A1 May 4, 2023

(30) Foreign Application Priority Data

Oct. 28, 2021 (JP) ................................. 2021-176535

(51) Int. Cl.
*H04N 1/32* (2006.01)
*H04N 1/00* (2006.01)

(52) U.S. Cl.
CPC ..... *H04N 1/32058* (2013.01); *H04N 1/00209* (2013.01); *H04N 1/00389* (2013.01)

(58) Field of Classification Search
None
See application file for complete search history.

(56) References Cited

U.S. PATENT DOCUMENTS

| 2002/0135813 A1* | 9/2002 | Tanimoto | H04N 1/33392 |
| | | | 358/402 |
| 2005/0069124 A1 | 3/2005 | Isozaki | |
| 2011/0129074 A1* | 6/2011 | Kunii | H04N 1/32708 |
| | | | 379/93.01 |

FOREIGN PATENT DOCUMENTS

JP 2005110012 A 4/2005

* cited by examiner

*Primary Examiner* — Lennin R Rodriguezgonzalez
(74) *Attorney, Agent, or Firm* — Scully, Scott, Murphy & Presser, P.C.

(57) ABSTRACT

An image transmission apparatus includes a plurality of keys, a scanner, a display, a memory, and a controller. The plurality of keys includes a plurality of numeric keys and a first specific key. The memory is capable of storing a plurality of telephone numbers associated with respective ones of the plurality of numeric keys. The controller controls the display to display a telephone number inputted via the plurality of numeric keys, and transmits the image data generated by the scanner to a transmission destination indicated by the displayed telephone number. In a case that operation of the first specific key is received and operation of one of the plurality of numeric keys, as an operated numeric key, is received, the controller reads a telephone number associated with the operated numeric key from the memory, and transmits the image data to a transmission destination indicated by the read telephone number.

30 Claims, 9 Drawing Sheets

IMAGE TRANSMISSION APPARATUS TRANSMITTING IMAGE DATA WHEN NUMERIC KEY AND SPECIFIC KEY ARE OPERATED

REFERENCE TO RELATED APPLICATIONS

This application claims priority from Japanese Patent Application No. 2021-176535 filed on Oct. 28, 2021. The entire content of the priority application is incorporated herein by reference.

BACKGROUND ART

There is known a facsimile device having a one-touch dial function. The facsimile device is provided with one-touch dial keys to which telephone numbers are assigned. When a user operates a one-touch dial key, the facsimile device performs facsimile transmission to a destination indicated by the telephone number assigned to the one-touch dial key according to the facsimile function.

DESCRIPTION

The one-touch dial keys are dedicated keys only for the one-touch dial function. Thus, a space for the one-touch dial keys is required on an operation panel.

In order to attain the above and other objects, one aspect of the disclosure provides an image transmission apparatus. The image transmission apparatus includes a plurality of keys, a scanner, a display, a memory, and a controller. The scanner is configured to generate image data. The plurality of keys includes a plurality of numeric keys and a first specific key. The memory is capable of storing a plurality of telephone numbers associated with respective ones of the plurality of numeric keys. The controller is capable of controlling the display to display a telephone number inputted via the plurality of numeric keys, and transmitting the image data generated by the scanner to a transmission destination indicated by the displayed telephone number. The controller is configured to perform: in a case that operation of the first specific key is received and operation of one of the plurality of numeric keys, as an operated numeric key, is received, reading a telephone number associated with the operated numeric key from the memory, and transmitting the image data to a transmission destination indicated by the read telephone number.

According to another aspect, the disclosure provides an image transmission apparatus. The image transmission apparatus includes a plurality of keys, a scanner, a display, a memory, and a controller. The scanner is configured to generate image data. The plurality of keys including a plurality of numeric keys, a plurality of direction keys, and a first specific key. The memory is capable of storing a plurality of telephone numbers associated with respective ones of the plurality of direction keys. The controller is capable of controlling the display to display a telephone number inputted via the plurality of numeric keys, and transmitting the image data generated by the scanner to a transmission destination indicated by the displayed telephone number. The controller is configured to perform: in a case that operation of the first specific key is received and operation of one of the plurality of direction keys, as an operated direction key, is received, reading a telephone number associated with the operated direction key from the memory, and transmitting the image data to a transmission destination indicated by the read telephone number.

With the structures, the image transmission device can have one-touch dial function while need to prepare the plurality of dedicated keys is eliminated.

The embodiment of the present disclosure will be described in details while like parts and components are designated with the same reference numerals to avoid duplicating description.

(Configuration of Image Transmission Apparatus 1)

An image transmission apparatus 1 will be described while referring to FIGS. 1-9. The image transmission apparatus 1 is a multifunction peripheral having a copier function, a printer function, a scanner function, and a facsimile function. The image transmission apparatus 1 may not have all of the four functions described above, and may have the scanner function and the facsimile function at least.

Figure 1:
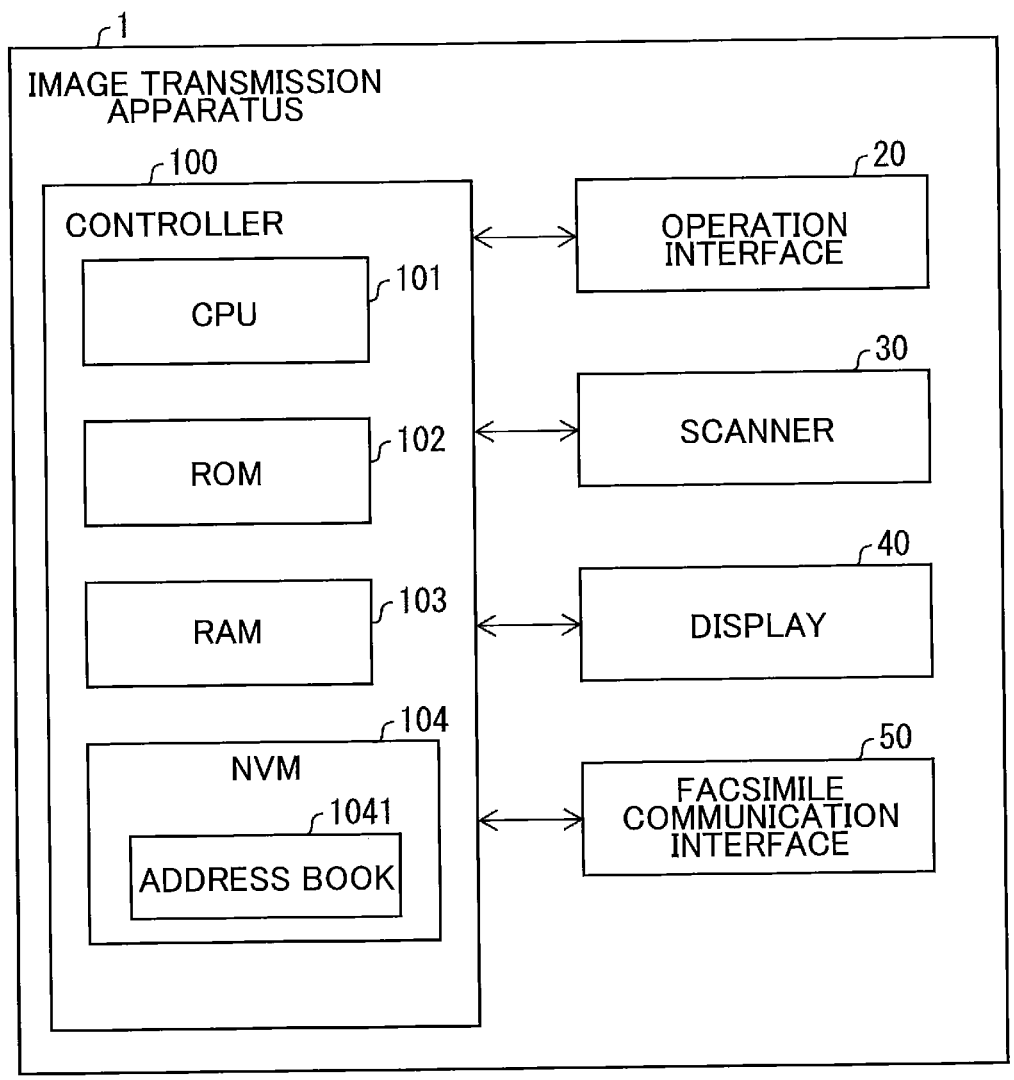
FIG. 1 is a block diagram illustrating the images transmission apparatus.

As illustrated in FIG. 1, the image transmission apparatus 1 includes a controller 100, an operation interface 20, a scanner 30, a display 40, and a facsimile communication interface 50. The controller 100 is electrically connected to the operation interface 20, the scanner 30, the display 40, and the facsimile communication interface 50.

The controller 100 includes a CPU 101, a ROM 102, a RAM 103, and an NVM (Non-Volatile Memory) 104.

The CPU 101 performs processes according to a program read from the ROM 102 and stores a result of the processes in the RAM 103 or the NVM 104 to control the components of the image transmission apparatus 1. The ROM 102 stores various programs. The various programs include, for example, a program for controlling the components of the image transmission apparatus 1. The RAM 103 is used as a working area and a data temporary storage area when the CPU 101 executes various programs. The programs may be stored in the RAM 103 or the NVM 104.

The NVM 104 is a rewritable nonvolatile memory. The NVM 104 is an example of the memory. A memory to be used in the present disclosure is not limited to the NVM 104.

The example of the storage medium storing the program may not be limited to the ROM 10, the RAM 103, and the NVM 104 built in the image transmission apparatus 1, but a storage medium that can be read and written by the CPU 101. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The following processes are basically executed by the CPU 101 according to the instructions described in the programs. In the following description, actions such as "select," "receive," "control" and the like represent processes performed by the CPU 101. Processes performed by the CPU 101 include processes that control hardware through APIs of an OS. In the present disclosure, operations of the programs are described while omitting the descriptions about the OS. That is, expressions such as "the program B controls the hardware C" may indicate "the program B controls the hardware C using the API of the OS". Further, a process executed by the CPU 101 according to instructions described in a program may be described using abbreviated expressions, such as "the CPU 101 executes". Alternatively, a process executed by the CPU 101 according to instructions described in a program may be described using abbreviated expressions, such as "the program A executes".

The terms "data" shares aspects of being bits or bit strings that computers can read. The computer treats "data" without considering the significance of its individual bits. Further, "data" is treated as the same data even when the format is different from each other. The same holds true for "information" in this specification. The terms "instructing" is a concept indicating outputting information which specifies instruction. Further, information specifying instruction may be described as "instruction".

Further, a process performed by the CPU 101 to determine whether information A indicates circumstance B may be described conceptually as "determining whether circumstance B based on information A." A process in which the CPU 101 determines whether information A indicates circumstance B or circumstance C may be described conceptually as "determining whether circumstance B or circumstance C based on information A."

Figure 2:
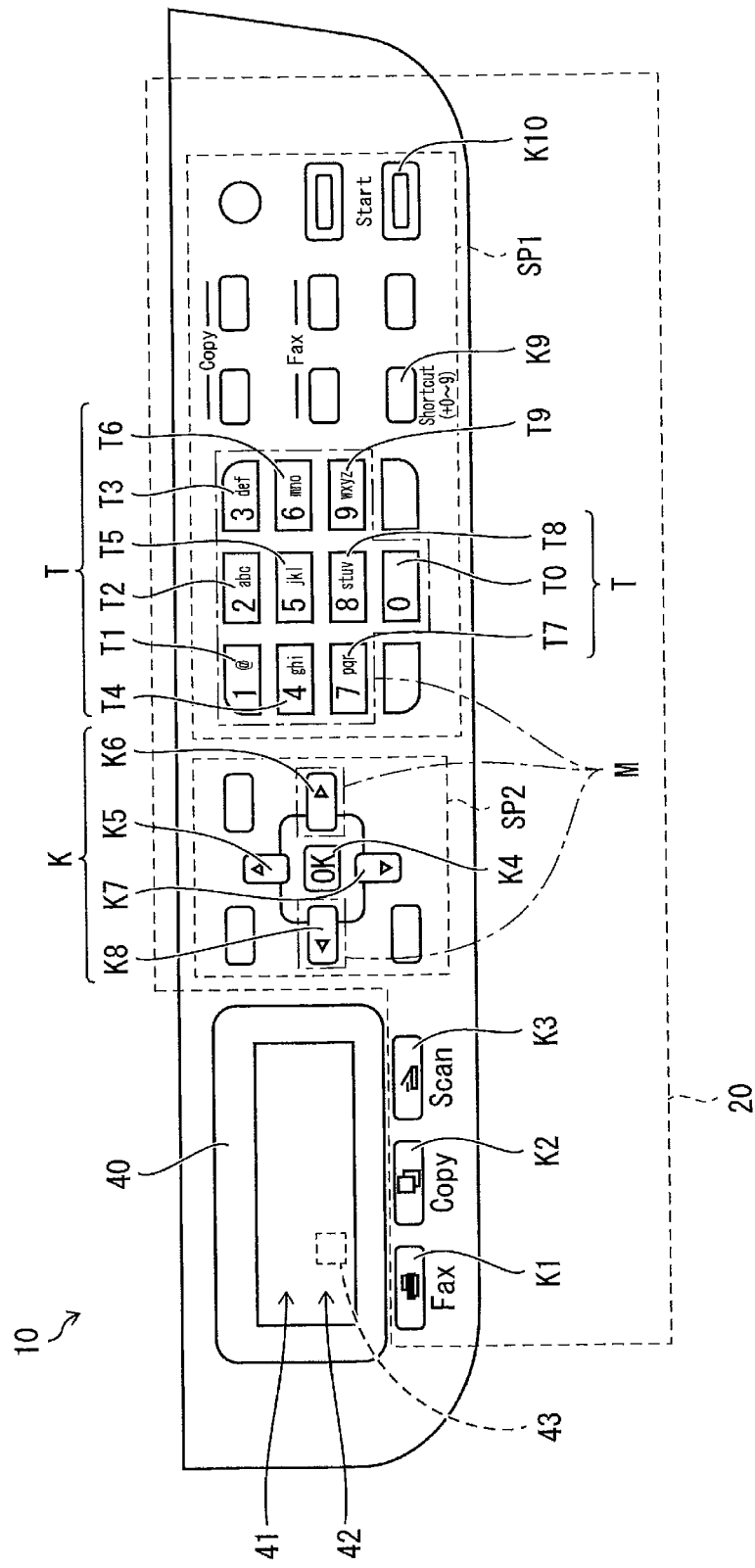
FIG. 2 is a view of an operation panel.

As shown in FIG. 2, an operation panel 10 is located in a main casing (not shown) of the image transmission apparatus 1. The display 40 and the operation interface 20 are arranged on the operation panel 10. The surface of the operation panel 10 includes a first arrangement space SP1 and a second arrangement space SP2 located on the right of the first arrangement space SP1. The display includes an upper line 41 and a lower line 42 located below the upper line 41.

The operation interface 20 includes a facsimile mode key K1, a copy mode key K2 and a scan mode key K3 arranged below the display 40. The operation interface 20 further includes four direction keys K (K5, K6, K7, and K8) and an OK key K4 arranged in the second arrangement space SP2. The operation interface further includes numeric keys T (T0-T9), a shortcut key K9, and a start key K10 which are arranged in the first arrangement space SP1.

The display 40 displays a telephone number inputted via the numeric keys T and/or the direction keys K. When the start key K10 is pressed while the display 40 displays the telephone number, the facsimile communication interface 50 start transmitting the image data to a transmission destination indicated by the displayed telephone number.

Flow of Key Operation Receiving Process

Figure 3:
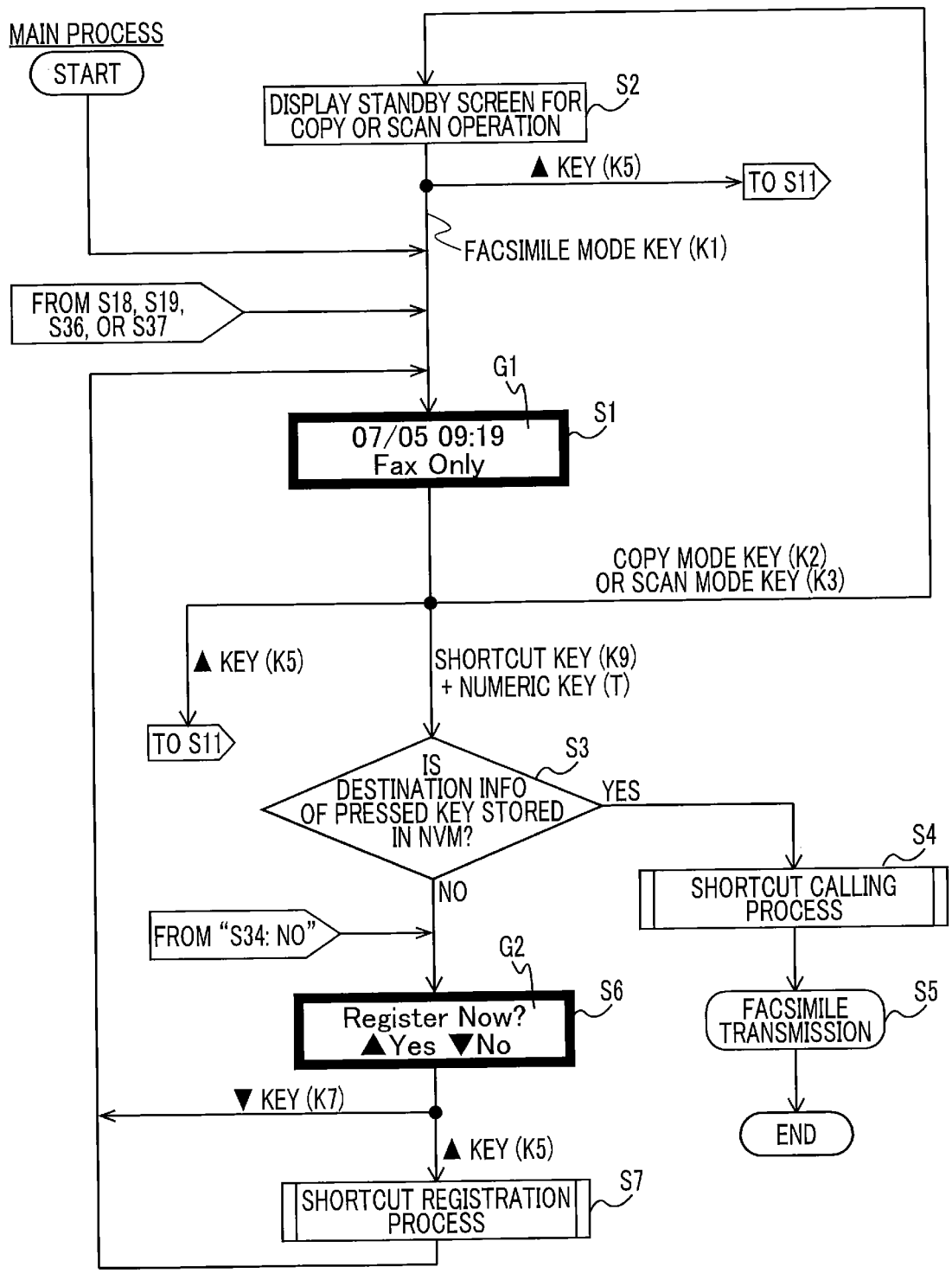
FIG. 3 is an explanation diagram illustrating transition of screens in a main process of a key operation receiving process.

A key operation receiving process will be described with reference to FIGS. 3 to 9. FIGS. 3-6, and 8-9 illustrates transition of screens. In FIGS. 3-6 and 8-9, contents of screens displayed in corresponding steps are surrounded by thick-bordered boxes which are indicated by the corresponding step numbers. Further, when displaying a certain step in each of FIGS. 3-6 and 8-9, the process branches several steps from the certain step based on keys being pressed. In such cases, FIGS. 3-6 and 8-9 show arrows indicating these several steps associated with the corresponding pressed keys. For example, the process of FIG. 3 branches from S6 to S1 or S7. Here, the process proceeds from S6 to S1 when the DOWN key K7 is pressed, and thus FIG. 3 shows the arrow from S6 to S1 associated with the DOWN key K7. Similarly, the process proceeds from S6 to S1 when the UP key K5 is pressed, and thus FIG. 3 shows the arrow from S6 to S7 associated with the UP key K5.

Figure 4:
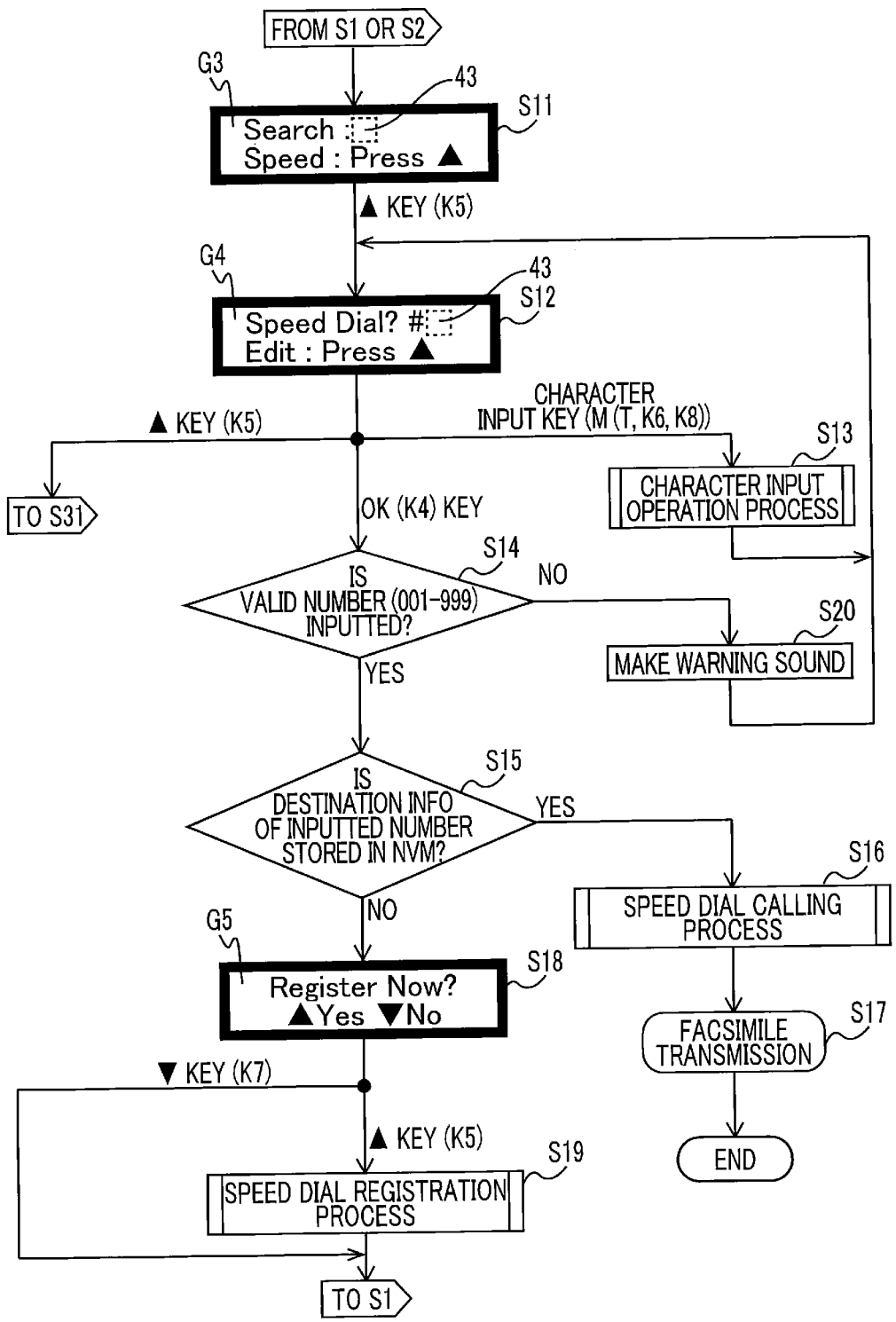
FIG. 4 is an explanation diagram illustrating transition of screens displayed from a screen shown in FIG. 3 in the main process.
Figure 5:
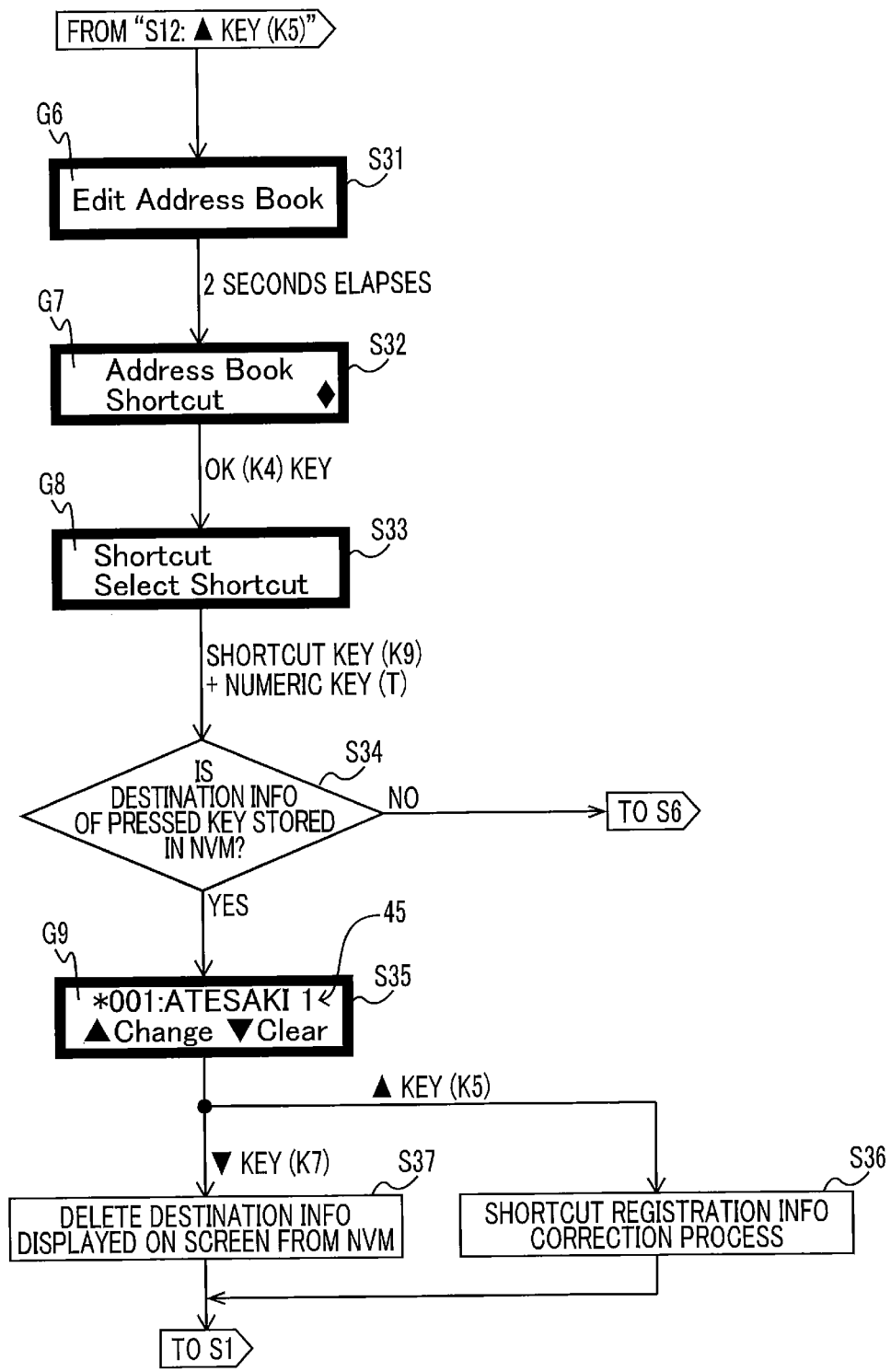
FIG. 5 is an explanation diagram illustrating transition of screens displayed from a screen shown in FIG. 4 in the main process.

A main process illustrated in FIGS. 3 to 5 starts when the image transmission apparatus 1 is powered on. The main process ends when the image transmission apparatus 1 is powered off.

In S1 the controller 100 displays a standby screen for facsimile transmission on the display 40, such as a screen G1. The upper line 41 of such a screen displays the current date and time. The lower line 42 of the screen displays information indicating that only operation for facsimile transmission is available. Each of the screens G1-G18 is an example of the screen displayed in the corresponding step. Every time a displaying step is executed, the display 40 displays a screen (one of the screens G1-G18) corresponding to a state at that point of time.

As illustrated in FIG. 2, the display 40 is an LCD or the like arranged on the left side of the surface of the operation panel 10 of the image transmission apparatus 1. The display 40 displays characters over the upper and lower lines 41 and 42. The display 40 displays a cursor 43 indicating a character input position on the screen.

When an UP key K5 is pressed, the controller 100 executes S11 illustrated in FIG. 4.

In a case that one of a copy mode key K2 and a scan mode key K3 is pressed while the standby screen for facsimile transmission is displayed in S1, in S2 the controller 100 displays a standby screen (not shown) for corresponding copy or scan operation on the display 40.

When a facsimile mode key K1 is pressed while the standby screen for copy or scan operation is displayed, the controller 100 returns to S1.

When the UP key K5 is pressed while the standby screen for copy or scan operation is displayed, the controller 100 executes S11 illustrated in FIG. 4.

In a case that one of the numeric keys T is pressed while a shortcut key K9 is pressed during the standby screen for facsimile transmission being displayed in S1, in S3 the controller 100 determines whether destination information associated with the pressed numeric key T is already stored in the NVM 104. The numeric keys T collectively indicate numeric keys T0 to T9 corresponding respectively to numerals "0" to "9".

As illustrated in FIG. 1, the NVM 104 stores data of an address book (phone book, or telephone directory) 1041. The address book 1041 is capable of storing a plurality of records each including a telephone number and a destination name. Each record is added with (and associated with) a registration number. Registration numbers 0 to 9 are associated respectively with the numeric keys T of 0 to 9. The telephone number is registered so as to be associated with the registration number. The destination name is registered so as to be associated with the registration number. The destination name is a name of a company or the like related to the telephone number. Hereinafter, the telephone number and the destination name are collectively referred to as destination information.

As described above, the numeric keys T of 0 to 9 are associated respectively with the registration numbers 0 to 9. When a record (the destination information) is associated with one of the registration numbers 0 to 9, the controller 100 determines that the record (the destination information) is also associated with the numeric key of the number equal to the registration number. In other words, the address book 1041 associates destination information with a numeric key (corresponding one of the numbers 0-9) by storing a relation between the destination information and the registration number (one of the numbers 0-9). For example, when destination information is associated with the registration number 0, the controller 100 determines that the destination information is associated with the numeric key T of 0.

The address book 1041 also has records including registration numbers 000 to 999. Hereinafter, destination information associated with each of the registration numbers 0 to 9 is referred to as "shortcut destination information", and destination information associated with each of the registration numbers 000 to 999 is referred to as "speed dial destination information". Further, the registration numbers 0 to 9 are each referred to as "shortcut registration number", and the registration numbers 000 to 999 are each referred to as "speed dial registration number". The shortcut destination information associated with the shortcut registration numbers 0-9 may be respectively the same as the speed dial destination information associated with the speed dial registration number 000-009.

The shortcut key K9 is an example of the first specific key. However, the first specific key may be a key other than the shortcut key K9. In more detail, the first specific key only needs to be a key whose operation is invalid when it is pressed on the standby screen for facsimile transmission and may be, for example, a DOWN key K7. Alternatively, in a case that the image transmission apparatus 1 is configured so that the operation of the UP key K5 is invalid when the standby screen for facsimile transmission is displayed, the UP key K5 may be used as the first specific key. When a key other than the shortcut key K9 is used as the first specific key, the shortcut key K9 which is a dedicated key for shortcut becomes unnecessary. When the shortcut key K9 becomes unnecessary, both of the shortcut key K9 and a space for the shortcut key K9 can be omitted from the surface of the operation panel 10, resulting in a reduction in size of the operation panel 10.

When the destination information associated with the pressed numeric key T is stored in the NVM 104 (S3: YES), in S4 the controller 100 executes a shortcut calling process illustrated in FIG. 6.

Figure 6:
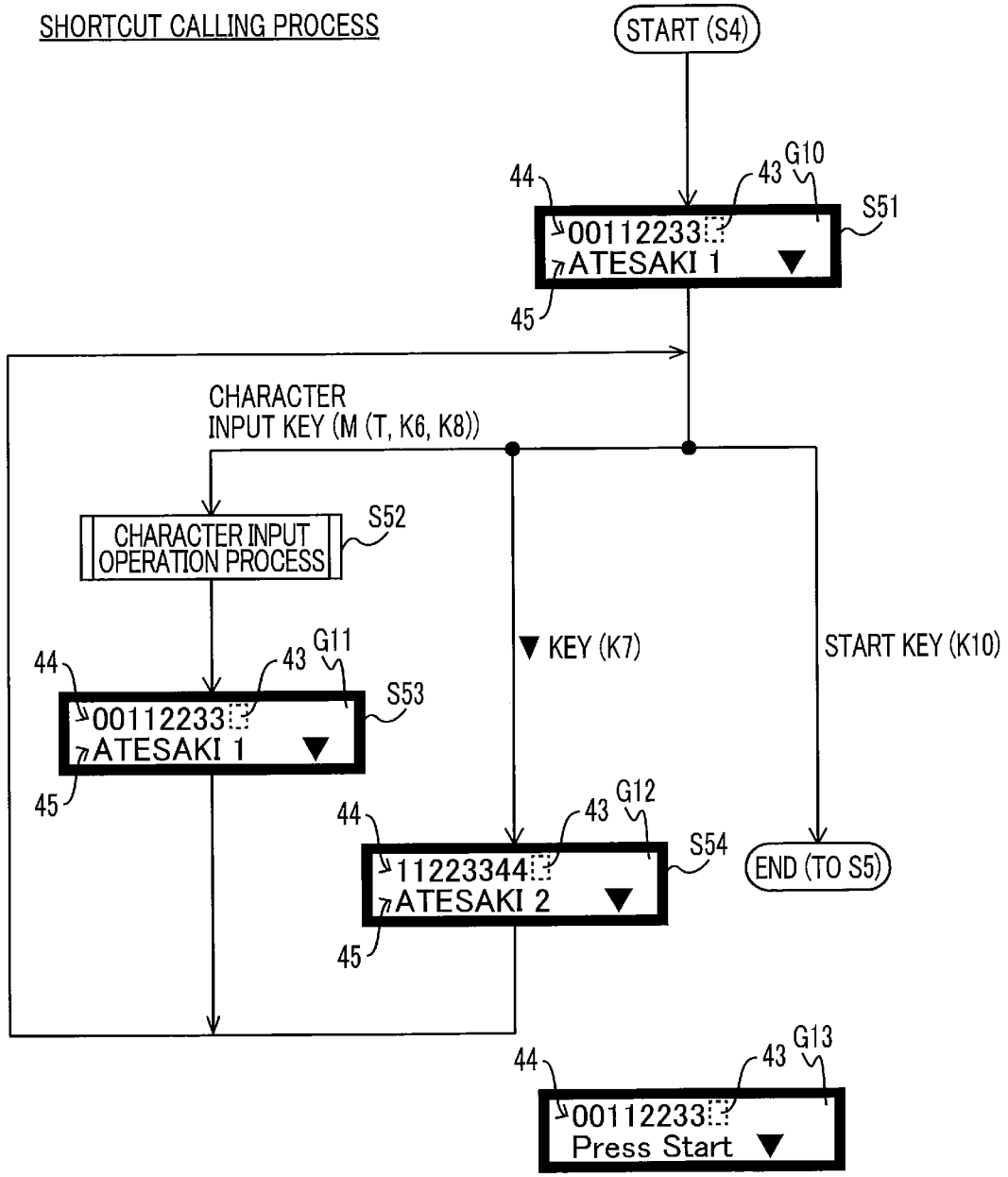
FIG. 6 is an explanation diagram illustrating transition of screens in a shortcut calling process.

In S51 of FIG. 6, the controller 100 reads, from the NVM 104, the destination information (telephone number 44 and destination name 45) associated with the pressed numeric key T and displays a screen for displaying the read destination information, such as a screen G10.

The upper line 41 of the screen shown in S51 displays the telephone number 44 included in the read destination information and the cursor 43. The cursor 43 is positioned at the right end of the telephone number 44. The lower line 42 of the screen displays the destination name 45 included in the read destination information. For example, the screen G10 displays information indicating that a telephone number "00112233" and a destination name "ATESAKI 1" are registered in association with the pressed numeric key T. When two or more records of the shortcut destination information associated with two or more numeric keys T are registered in the address book 1041, a solid-black inverted triangle indicating downward is displayed at the right end of the lower line 42 of the screen.

In a case that one of character input keys M is pressed while the screen of S51, S53 (described later), or S54 (described later) is displayed, in S52 the controller 100 executes a character input operation process illustrated in FIG. 7. The character input keys M collectively indicate the numeric keys T, a RIGHT key K6, and a LEFT key K8.

Figure 7:
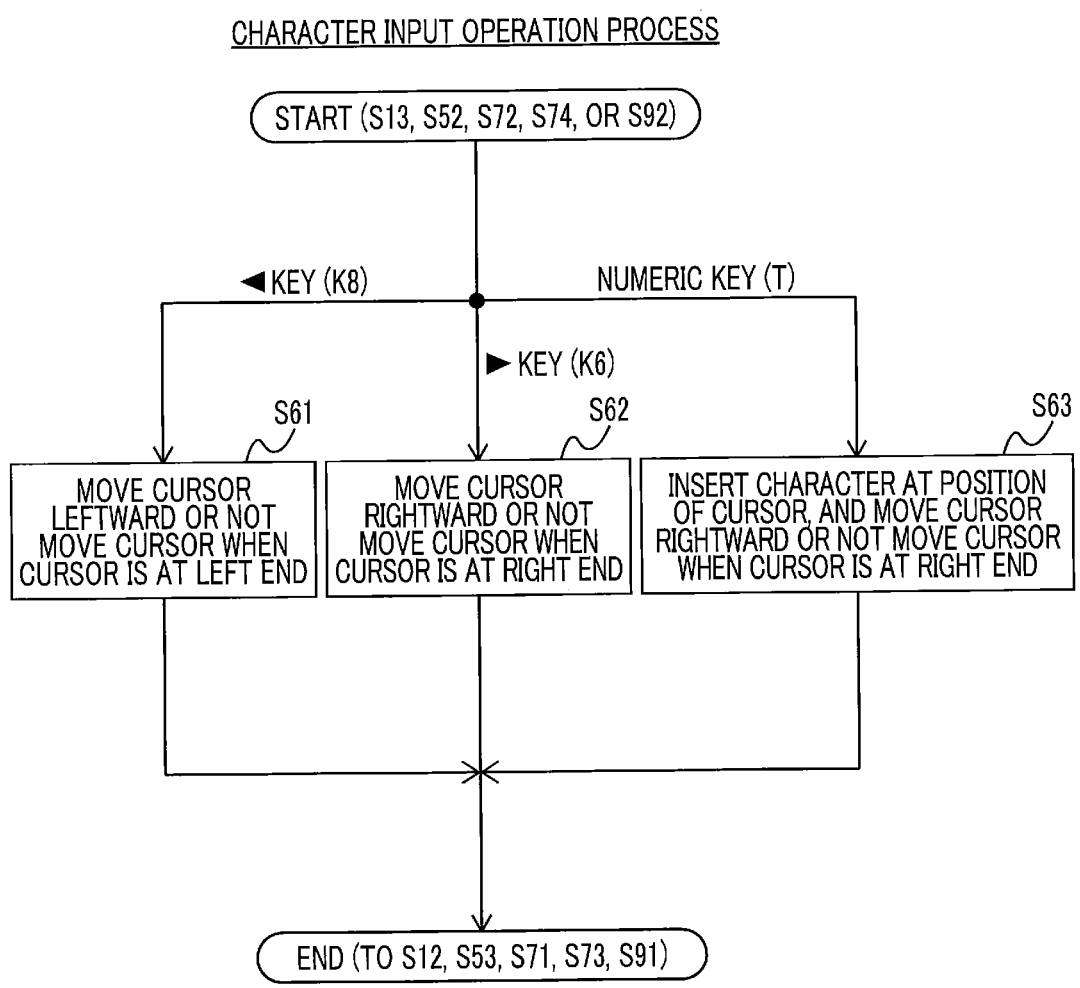
FIG. 7 is a flowchart illustrating a character input operation process.

For example, when the LEFT key K8 is pressed from among the character input keys M, in S61 of FIG. 7 the controller 100 moves leftward the cursor 43 displayed on the upper line 41 of the screen. When the cursor 43 is located at the leftmost position on the screen, the controller 100 does not move the cursor 43.

On the other hand, when the RIGHT key K6 is pressed from among the character input keys M, in S62 the controller 100 moves rightward the cursor 43 displayed on the upper line 41 of the screen. When the cursor 43 is located at the rightmost position on the screen, the controller 100 does not move the cursor 43.

When one of the numeric keys T is pressed, in S63 the controller 100 inserts a corresponding character of the numeric key T at the position of the cursor 43 and then moves the cursor 43 rightward. When the cursor 43 is located at the rightmost position on the screen, the controller 100 does not move the cursor 43.

The above describes a case where the character input key M is pressed while the screen is displayed in S51. However, the character input operation process can also be executed when the character input key M is pressed while a screen other than the screen of S51 is displayed. In such a case, the reference numerals of the components of the screen, position (upper or lower line) of the screen may be replaced appropriately. When the same numeric key T is successively pressed a plurality of times, the corresponding alphabet is inputted in the character input operation process.

Referring back to FIG. 6, in S53 the controller 100 displays a screen indicating a telephone number edited in the character input operation process. For example, the controller 100 displays, on the display 40, a screen G11 indicating the edited telephone number. Then, the controller 100 returns to determination of the pressed key.

When the DOWN key K7 of FIG. 2 is pressed while the screen of S51, S53, or S54 is displayed, in S54 the controller 100 reads, from the NVM 104, the shortcut destination information associated with the registration number next to the registration number of the destination information currently displayed on the screen. Subsequently, in S54 the controller 100 displays, on the display 40, a screen including the read telephone number 44 and destination name 45 such as a screen G12. The displayed screen G12 includes information indicating that a telephone number "11223344" and a destination name "ATESAKI 2" are registered in association with the registration number next to the number of the pressed numeric key T. Then, the controller 100 returns to determination of the pressed key.

The next registration number refers to the number specified as the next registration number among the registration numbers with which the destination information is associated. For example, assume that destination information associated with registration number 0 is displayed on the screen. In this case, when destination information associated with registration number 1 is registered in the address book 1041, the number "1" is the next registration number. On the other hand, when destination information associated with registration number 1 is not registered in the address book 1041, and destination information associated with registration number 2 is registered in the address book 1041, the number "2" is the next registration number.

When the start key K10 is pressed while the screen of S51, S53, or S54 is displayed, the controller 100 ends the shortcut calling process and executes S5 illustrated in FIG. 3.

When no user operations are performed in a period of 5 seconds while the screen of S51, S53, or S54 is displayed, the controller 100 displays, on the display 40, a screen displaying a notification prompting the user to press the start key K10, for example, a screen G13. Even when the notification screen such as the screen G13 is displayed, the controller 100 performs the process same as the process performed before this notification screen is displayed. That is, for example, assume that the screen G13 is changed from the screen G12. In this case, when the DOWN key K7 is pressed, the controller 100 displays, on the display 40, the shortcut destination information associated with the registration number next to the registration number associated with the destination information displayed on the screen G13 similarly to the screen of S54. Or, when the start key K10 is pressed, the controller 100 ends the shortcut calling process and executes S5.

When the start key K10 is pressed while any screen illustrated in FIG. 6 is displayed, the flow returns to S5 of FIG. 3. In S5 the controller 100 transmits image data to a destination indicated by the telephone number displayed on the screen. The image data is data generated by the scanner 30 and stored in the RAM 103. The controller 100 is connected to an external telephone line through the facsimile communication interface 50 illustrated in FIG. 1 and thus can perform facsimile transmission based on the telephone number.

After transmitting the image data, the controller 100 displays the screen G1 once again, for example. Thereafter, when power is turned off, the controller 100 ends the key operation receiving process.

A user can transmit image data by operating only the shortcut key K9, numeric key T, and start key K10 which are arranged in the first arrangement space SP1 on the surface of the operation panel 10. The keys to be operated are collectively arranged in the first arrangement space SP1, allowing the user to perform a smooth operation. Further, since the DOWN key K7 is arranged in the second arrangement space SP2 different from the first arrangement space SP1, the user is less likely to erroneously operate the DOWN key K7 to change the read telephone number 44, improving user-friendliness of key arrangement of the operation panel 10.

Further, the user can change the telephone number 44 by operating only the numeric key T arranged in the first arrangement space SP1 on the surface of the operation panel 10 and the RIGHT key K6 and LEFT key K8 which are arranged in the second arrangement space SP2 adjacent to the first arrangement space SP1. That is, the user can change the telephone number 44 only with neighboring keys, improving user-friendliness of key arrangement of the operation panel 10.

When the destination information associated with the pressed numeric key T is not stored in the NVM 104 (S3: NO), in S6 the controller 100 displays, on the display 40, a screen for selecting whether or not to register the destination information to be associated with the pressed numeric key T, such as the screen G2. The upper line 41 of this screen displays information indicating that it is selectable whether to resister the destination information or not. The lower line 42 of the screen displays a notification prompting the user to press the UP key K5 when registering the destination information and to press the DOWN key K7 when not registering the destination information.

When the DOWN key K7 is pressed, the controller 100 returns to S1.

Figure 8:
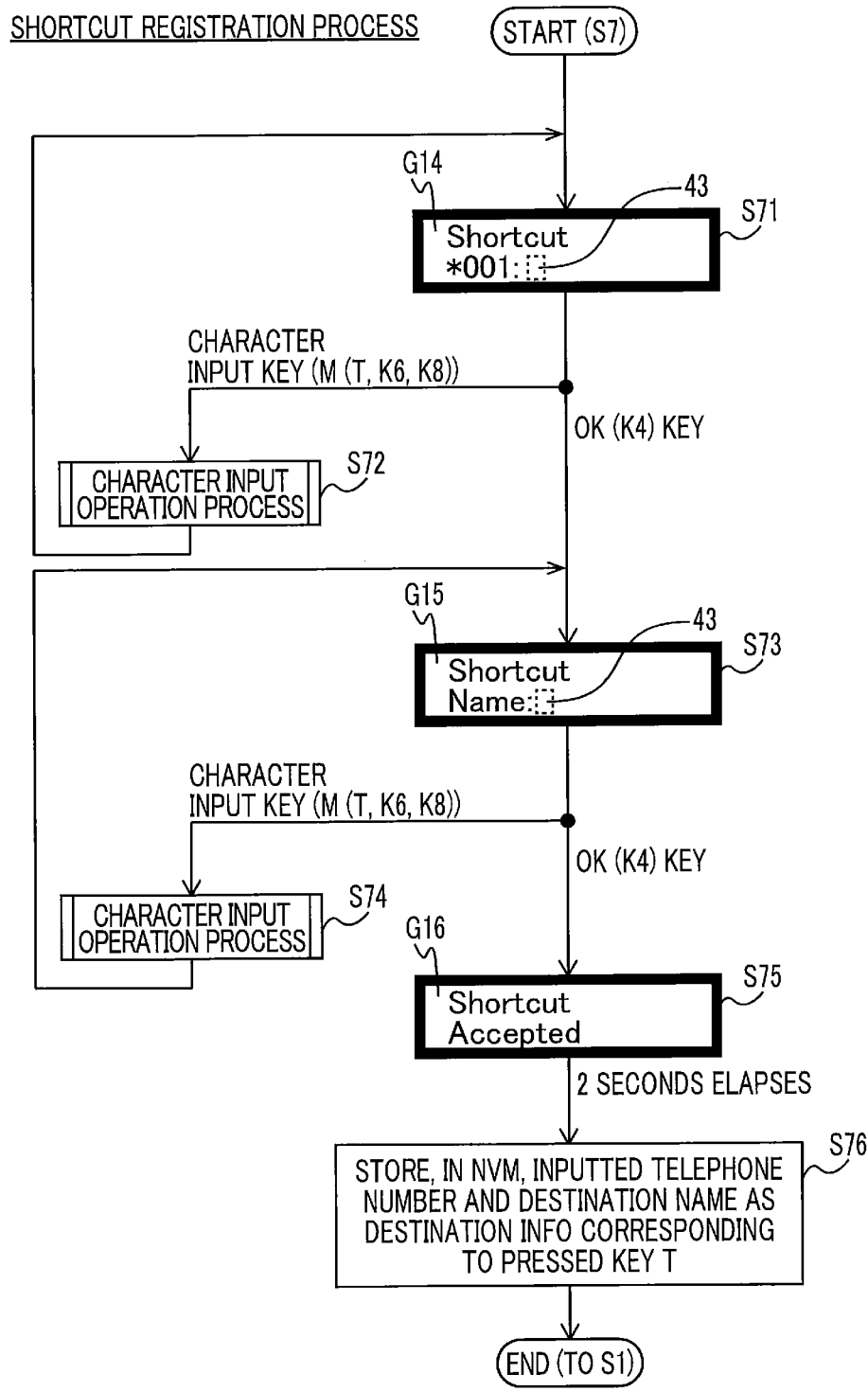
FIG. 8 is an explanation diagram illustrating transition of screens in a shortcut registration process.

When the UP key K5 is pressed, in S7 the controller 100 executes a shortcut registration process illustrated in FIG. 8.

In S71 of FIG. 8 the controller 100 displays, on the display 40, a screen for shortcut registration such as a screen G14. The upper line 41 of the screen displays information indicating that this screen is for shortcut registration. The lower line 42 of the screen displays a number corresponding to the pressed numeric key T and the cursor 43. For example, the screen G14 displays a notification prompting the user to input a telephone number to be registered in association with the registration number "1" of the shortcut which is a number indicated by the numeric key T pressed while the screen of S1 is displayed.

In a case that the character input key M is pressed while the screen of S71 is displayed, in S72 the controller 100 executes the character input operation process to receive operation for inputting a telephone number. The details of the character input operation process are as described for FIG. 7. Thereafter, the controller 100 returns to S71 and displays a screen indicating the telephone number inputted in the character input operation process.

In a case that an OK key K4 illustrated in FIG. 2 is pressed while the screen of S71 is displayed, in S73 the controller 100 displays, on the display 40, a screen for prompting the user to input a destination name such as a screen G15. The upper line 41 of the screen displays information indicating that this screen is for shortcut registration. The lower line 42 of the screen displays an input field for the destination name and the cursor 43. For example, the screen G15 displays a notification prompting the user to input a destination name to be registered as the destination information of the shortcut.

In a case that the character input key M is pressed while the screen of S73 is displayed, in S74 the controller 100 executes the character input operation process to receive operation for inputting a destination name. The character input operation process is executed similarly to that of FIG. 7. Thereafter, the controller 100 returns to S73 and displays a screen indicating the destination name inputted in the character input operation process.

When an OK key K4 illustrated in FIG. 2 is pressed while the screen of S73 is displayed, in S75 the controller 100 displays, on the display 40, a screen indicating that a telephone number and a destination name to be registered as the destination information of the shortcut have been received, such as a screen G16.

When 2 seconds have elapsed after the display of the screen in S75, in S76 the controller 100 stores, in the NVM 104, the telephone number inputted in S72 and destination name inputted S74 as the destination information to be associated with the numeric key T pressed while the screen of S1 is displayed. Thereafter, the controller 100 returns to S1.

FIG. 4 illustrates a case that the UP key K5 is pressed while the standby screen of S1 or S2 is displayed. In S11 of FIG. 4 the controller 100 displays, on the display 40, a screen for starting keyword search for the destination information from the address book 1041, such as a screen G3. The upper line 41 of this screen displays a notification prompting the user to input a keyword for search and the cursor 43. The lower line 42 of the screen displays a notification prompting the user to press the UP key K5 to search for the speed dial destination information stored in the NVM 104. The UP key K5 is an example of the second specific key.

In a case that the UP key K5 is pressed while the display of S11 is displayed, in S12 the controller 100 displays a screen G4, for example. The upper line 41 of the screen G4 displays a notification prompting the user to input the speed dial registration number and the cursor 43. The lower line 42 of the screen displays a notification prompting the user to press the UP key K5 to edit the address book 1041.

In a case that the UP key K5 is pressed while the display of S12 is displayed, the controller 100 executes S31 illustrated in FIG. 5.

In a case that the character input key M is pressed while the display of S12 is displayed, in S13 the controller 100 executes the character input operation process. The character input operation process is executed similarly to that of FIG. 7. Thereafter, the controller 100 returns to S12 and displays a screen indicating the registration number inputted in the character input operation process.

In a case that the OK key K4 is pressed while the display of S12 is displayed, in S14 the controller 100 determines whether the inputted speed dial registration number is valid or not. "The inputted speed dial registration number is valid" means that an inputted three-digit number falls within a predetermined range (that is, for example, the inputted number is any one of 001 to 999). The valid speed dial registration number may be set in a part of the above range (for example, in a range of 001 to 200). The valid speed dial registration number is not limited to the three-digit number and may be two-digit number or four- or more-digit number.

When the inputted speed dial registration number is valid (S14: YES), in S15 the controller 100 determines whether destination information associated with the inputted registration number is already stored in the NVM 104.

In a case that the destination information associated with the inputted registration number is stored in the NVM 104 (S15: YES), in S16 the controller 100 executes a speed dial calling process illustrated in FIG. 9.

Figure 9:
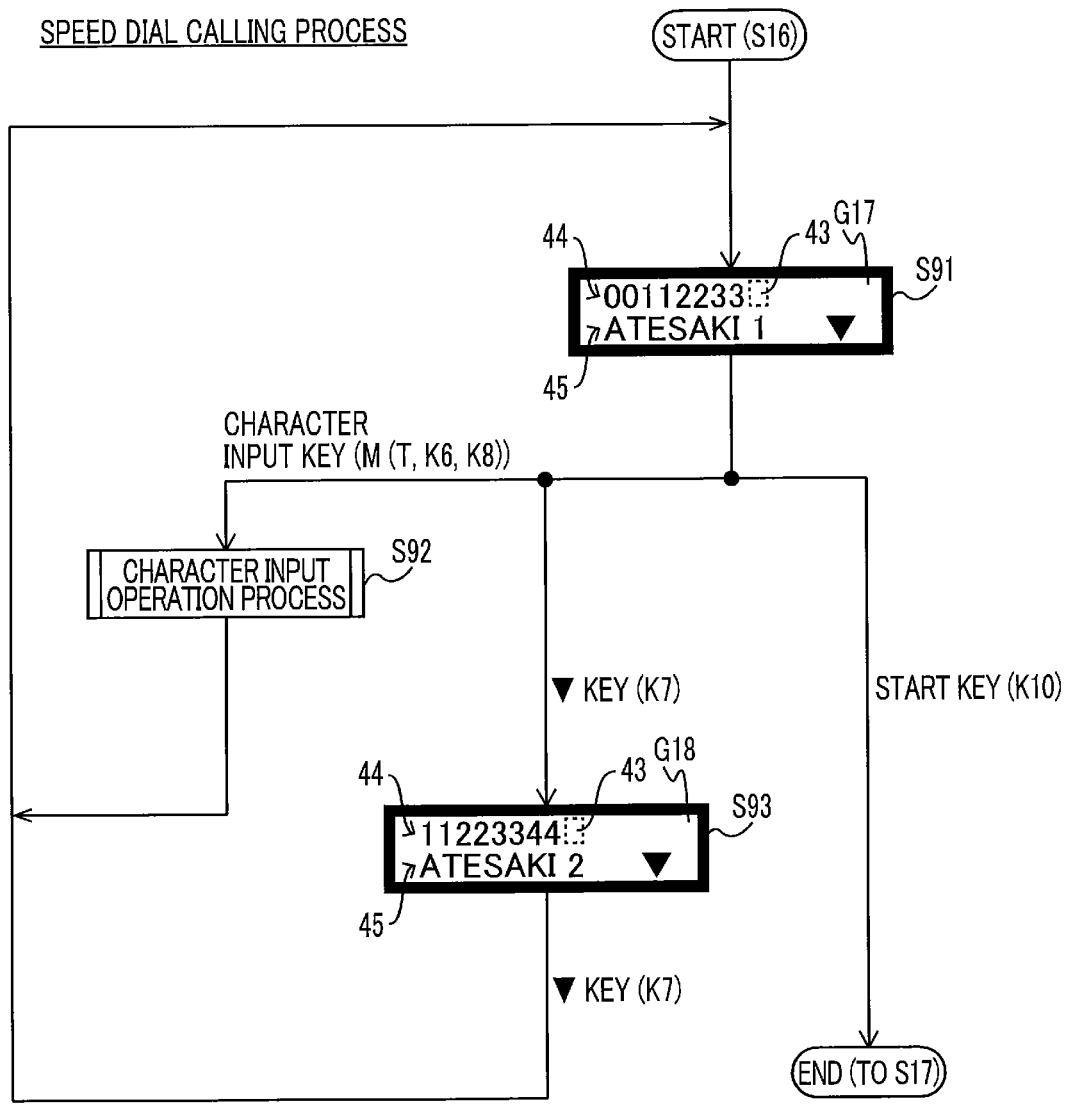
FIG. 9 is an explanation diagram illustrating transition of screens in a speed dial calling process.

In S91 of FIG. 9, the controller 100 reads, from the NVM 104, the destination information (telephone number 44 and destination name 45) associated with the three-digit number indicated by the numeric keys T pressed according to the screen S12, and displays a screen G17. The content displayed on the screen in S91 is the same as that of the screen in S51 (FIG. 6) except that the destination information displayed on the screen is not the shortcut destination information but the speed dial destination information.

Here, the screens G17 and G18 (described later) for the speed dial destination information display the telephone numbers 44 and destination information 45 respectively the same as those of the screen G10 and G12 (FIG. 6) for the shortcut dial destination information. This allows the user to perform facsimile transmission to the same destination indicated by the destination name 45 by using either the shortcut or speed dial.

When the start key K10 is pressed while the screen of S91 or S93 is displayed, the controller 100 ends the speed dial calling process and executes S17 illustrated in FIG. 4.

In a case that the character input key M is pressed while the screen of S91 (or S93) is displayed, in S92 the controller 100 executes the character input operation process. The details of the character input operation process are as described for FIG. 7. Thereafter, the controller 100 returns to S91 (or S93) and displays a screen indicating the telephone number edited in the character input operation process.

In a case that the DOWN key K7 illustrated in FIG. 2 is pressed while the screen of S91 is displayed, in S93 the controller 100 reads, from the data of the address book 1041 stored in the NVM 104, the next telephone number 44 and destination name 45 which are registered in association with the registration number next to the registration number of the telephone number 44 displayed on the screen, and displays the screen G18 for displaying the read information on the display 40, for example. The contents of the screen of S93 are displayed similarly to those of the screen in S91.

In a case that the DOWN key K7 illustrated in FIG. 2 is pressed while the screen is displayed in S93, the controller 100 returns to step S91 and reads, from the NVM 104, the next telephone number 44 and destination name 45 which are registered in association with the registration number next to the registration number of the telephone number 44 displayed on the screen, and displays the screen showing the read information.

FIG. 9 shows an example in which only two records of the speed dial destination information are stored in the address book 1041, and thus illustrates a state that the two screens G17 and G18 are switched from one to another by pressing the DOWN key K7. When three or more records of the speed dial destination information are stored in the address book 1041, screens as many as the number of registered records of the destination information are sequentially switched from one to another by pressing the Down key K7.

In a case that the start key K10 is pressed while the screen of S91 or S93 illustrated in FIG. 9 is displayed, the flow returns to S17 of FIG. 4. In S17 the controller 100 transmits, through the facsimile communication interface 50, image data to the destination indicated by the telephone number 44 displayed on the screen. The image data is data generated by the scanner 30 and stored in the RAM 103. The controller 100 is connected to the external telephone line through the facsimile communication interface 50 illustrated in FIG. 1, and thus can perform facsimile transmission based on the telephone number.

After transmitting the image data, the controller 100 displays the screen G1 once again, for example. Thereafter, when power is turned off, the controller 100 ends the key operation receiving process.

As illustrated in FIG. 2, a user can transmit image data by operating only the start key K10 arranged in the first arrangement space SP1 on the surface of the operation panel 10. The key to be operated is arranged in the first arrangement space, allowing the user to perform a smooth operation. Further, direction keys K (the UP key K5, RIGHT key K6, DOWN key K7, and LEFT key K8) are arranged in the second arrangement space SP2 different from the first arrangement space SP1, reducing the risk of the user's inadvertent operation of the direction key K to change undesirably the read telephone number 44. Thus, the user-friendliness of key arrangement on the operation panel 10 can be improved.

Further, even when a change in the telephone number is required, the user can transmit image data by operating only the keys arranged in the first arrangement space SP1 on the surface of the operation panel 10 and the second arrangement space SP2 adjacent to the first arrangement space SP1. Thus, the user-friendliness of key arrangement on the operation panel 10 can also be improved.

Returning to FIG. 4, when the destination information associated with the inputted number is not stored in the NVM 104 (S15: NO), in S18 the controller 100 displays, on the display 40, a screen for selecting whether or not to register the destination information associated with the inputted number, such as a screen G5. The displayed contents of this screen are the same as those of the screen shown in S6.

In a case that the DOWN key K7 is pressed while the screen of S18 is displayed, the controller 100 returns to S1 illustrated in FIG. 3.

When the UP key K5 is pressed while the screen of S18 is displayed, in S19 the controller 100 executes a speed dial registration process. The content of the speed dial registration process is basically the same as that of the shortcut registration process illustrated in FIG. 8, so a detailed description thereof will be omitted. The difference between the shortcut registration process and the speed dial registration process is that the former registers the destination information in association with the registration numbers 0 to 9 inputted in the character input operation, while the latter registers the destination information in association with the registration numbers 000 to 999 inputted in the character input operation.

When ending the speed dial registration process, the controller 100 returns to S1 illustrated in FIG. 3.

When the inputted speed dial registration number is invalid (S14: NO), in S20 the controller 100 emits a warning sound such as a buzzing sound indicating that the inputted registration number is invalid (or indicating the inputted registration number is refused) and then returns to S12.

While a detailed description of the process to be performed upon input of a search keyword to the screen in S11 will be omitted, the controller 100 operates a searching process as follows. That is, when receiving the character input operation, the controller 100 searches for a destination name including the inputted character and displays a screen indicating destination information having the smallest registration number, for example, the screen G17 illustrated in FIG. 9. When the DOWN key K7 is pressed, the controller 100 displays a screen indicating the next destination information.

In a case that the UP key K5 is pressed while the screen of S12 is displayed, in S31 of FIG. 5 the controller 100 displays, on the display 40, a screen for notifying starting of editing the address book 1041, such as a screen G6.

When 2 seconds have elapsed after display of the screen in S31, in S32 the controller 100 displays, on the display 40, a screen for notifying starting selection of a shortcut registration number, such as a screen G7.

In a case that the OK key K4 is pressed while the screen of S32 is displayed, in S33 the controller 100 displays, on the display 40, a screen for prompting the user to select a shortcut registration number, such as a screen G8.

In a case that one of the numeric keys T is pressed while the shortcut key K9 is pressed during the screen of S33 being displayed, in S34 the controller 100 determines whether destination information associated with the numeric key T, which is pressed while the screen of S33 is displayed, is stored in the address book 1041 in the NVM 104.

When the destination information associated with the pressed numeric key T is not stored in the NVM 104 (S34: NO), the controller 100 executes S6 illustrated in FIG. 3.

When the destination information associated with the pressed numeric key T is stored in the NVM 104 (S34: YES), in S35 the controller 100 reads, from the NVM 104, the destination information (telephone number 44 and destination name 45) associated with the pressed numeric key T and displays, on the display 40, a screen for correcting or deleting the destination information associated with the (registration) number indicated by the pressed numeric key T, such as a screen G9. The upper line 41 of this screen displays the number indicated by the pressed numeric key T and the destination name 45 before being corrected. For example, the screen G9 indicates that a destination name "ATESAKI 1" is registered in association with a registration number "1". The lower line 42 of the screen displays a notification prompting the user to press the UP key K5 when correcting the destination information and to press the DOWN key K7 when deleting the destination information.

Here, each of the screens G9, and G14 (FIG. 8) is a screen for operating the destination information associated with the shortcut registration number "1". On the screen for operating the shortcut destination information, the shortcut registration number is prefixed with "*00". Thus, on the screens G9, and G14 the shortcut registration number "1" is prefixed with "*00", that is, "*001" is displayed.

In a case that the UP key K5 illustrated in FIG. 2 is pressed while the screen of S35 is displayed, in S36 the controller 100 executes a shortcut registration information correction process. The shortcut registration information correction process is basically the same as that of the shortcut registration process, so a detailed description thereof will be omitted. Note that the difference between the shortcut registration process and the shortcut registration information correction process is that the former registers new destination information inputted in the character input operation, while the latter corrects the registered destination information to destination information edited in the character input operation.

After ending the shortcut registration information correction process, the controller 100 returns to S1 illustrated in FIG. 3.

In a case that the DOWN key K7 illustrated in FIG. 2 is pressed while the screen of S35 is displayed, in S37 the controller 100 deletes, from the NVM 104, the destination information displayed on the screen.

After deleting the destination information, the controller 100 returns to S1 illustrated in FIG. 3.

Modification 1

The controller 100 of the image transmission apparatus 1 may register, as the shortcut destination information, the telephone number and destination name in the address book 1041 stored in the NVM 104 in association with the direction indicated by each direction key K (FIG. 2) rather than or in addition to the numeric key T. For example, the records including the registration numbers "0" to "3" may be associated with the four direction keys K.

In this case, when each of the direction keys K is pressed (in place of the numeric key) together with the shortcut key K9, the controller 100 reads, from the address book 1041 stored in the NVM 104, the registered telephone number 44 and destination name 45 in association with the pressed direction key K and displays a screen for showing the read telephone number 44 and destination name 45.

Modification 2

When registering the shortcut destination information in the address book 1041 stored in the NVM 104 (S6 executed from S1 via S3, or S6 executed from S33 via S34 (FIG. 5), for example), the controller 100 of the image transmission apparatus 1 may register an inputted telephone number and a destination name after the numeric key T (FIG. 2) is pressed while a specific key different from the shortcut key K9 is pressed.

In this case, when the numeric key T is pressed while the specific key different from the shortcut key K9 is pressed, the controller 100 reads, from the address book 1041 stored in the NVM 104, the telephone number 44 and destination name 45 registered in association with the pressed numeric key T and displays a screen showing the read telephone number 44 and destination name 45.

Modification 3

When registering the speed dial destination information in the address book 1041 stored in the NVM 104, the controller 100 of the image transmission apparatus 1 may register an inputted telephone number and destination name, after the three numeric keys T (FIG. 2) are successively pressed for inputting the three-digit number while a specific key which is different from the UP key K5 is pressed so that the inputted telephone number and destination name are in association with the three-digit number indicated by the pressed three numeric keys T.

In this case, in a case that the telephone number and destination name are already registered in association with the three-digit number and subsequently the three numeric keys T is pressed for inputting the three-digit number while the specific key different from the UP key K5 (FIG. 2) is pressed, the controller 100 reads, from the address book 1041 stored in the NVM 104, the telephone number 44 and destination name 45 registered in association with the three-digit number indicated by the pressed three numeric keys T and displays a screen indicating the read out telephone number 44 and destination name 45.

According to the embodiments and modifications described above, when receiving the operation of the shortcut key K9 and the numeric key T, the controller 100 reads the telephone number 44 associated with the numeric key T, whose operation has been received, from the NVM 104 storing the telephone numbers 44 in association with the respective numeric keys T. Then, the controller 100 transmits image data stored in the RAM 103 to the destination indicated by the read telephone number 44.

In the above configuration, each numeric key T associated with a telephone number 44 serves also as a key for receiving an input of a telephone number from a user when the user inputs the telephone number to the image transmission apparatus 1. The conventional configuration has dedicated keys to be associated with the telephone numbers, while the above configuration does not require such dedicated keys.

Thus, according to the configuration described above, in the image transmission apparatus 1 having a one-touch dial function, a plurality of dedicated keys, which is required in the conventional configuration, is no longer necessary.

Further, when receiving the operation of the shortcut key K9 and the direction key K (FIG. 2), the controller 100 may read the telephone number associated with the direction key K, whose operation has been received, from the NVM 104 storing the telephone numbers in association with the respective direction keys K, and then transmit image data to a destination indicated by the read telephone number.

In the above configuration, the direction key K associated with the telephone number 44 serves also as a key for moving the cursor when a user inputs the telephone number or destination name to the image transmission apparatus 1 or for scrolling the shortcut or speed dial destination information. That is, with the above configuration, the dedicated keys are not needed.

Further, the shortcut key K9, which is an example of the first specific key, is a dedicated key for reading, from the NVM 104, the telephone number associated with one of the numeric keys T and direction keys K whose operation has been received.

According to the above configurations, when reading the telephone number 44 stored in the NVM 104, a user only needs to operate fixed keys. Accordingly, the above configuration can reduce confusion of the user and improve user convenience.

The dedicated key is a key provided only for accessing shortcut destination information. However, the dedicated key may also be used for exceptional operations. For example, the dedicated key may be used for executing a hidden function (or undocumented function).

When receiving the operation of the DOWN key K7, which is one of the direction key K, in a state that the telephone number 44 is displayed on the display 40, the controller 100 newly reads, from among the telephone numbers 44 stored in the NVM 104, a telephone number 44 not displayed on the display 40 and updates the display 40 to newly display the newly read telephone number 44. Then, the controller 100 transmits image data to a destination indicated by the newly displayed telephone number 44.

According to the above configuration, even after the telephone number 44 is read and displayed on the display 40, a user can change display of the telephone number 44 and transmit image data to a destination indicated by a newly displayed telephone number 44.

Further, assume a case that the controller 100 repeatedly receives the operations of the DOWN key K7 which is one of the direction keys K. In this case, each time the controller 100 receives an operation of the DOWN key K7 in a state that a telephone number is displayed on the display 40, the controller 100 reads, from among the telephone numbers 44 stored in the NVM 104, a telephone number 44 not currently displayed on the display 40, and updates the display to newly display the newly read telephone number 44.

According to the above configuration, by only repeatedly operating the DOWN key K7, non-displayed telephone numbers 44 can be sequentially displayed. This improves user convenience.

Further, when the telephone number 44 displayed on the display 40 is corrected by operation of the direction key K and the numeric key T, the controller 100 transmits image data to a destination indicated by the corrected telephone number 44.

According to the above configuration, even after the telephone number 44 is read from the NVM 104 and displayed on the display 40, a user can correct the telephone number 44 and transmit image data to a destination indicated by a new telephone number 44 that is yet to be stored in the NVM 104.

Further, in a case that the operation of the shortcut key K9, which is an example of the first specific key, is received and the operation of one of the numeric keys T and direction keys K, with which the telephone number 44 can be associated, is also received while the operated key (K or T) is not associated with the telephone number 44, the controller 100 stores a new telephone number 44 inputted by operation of the numeric keys T to be in association with the operated key in the NVM 104. Here, the shortcut key K9 is an example of the first specific key.

According to the above configuration, when the telephone number 44 is not associated with the operated key T or K, a new telephone number 44 inputted by operation of the numeric keys T can be newly stored to be in association with the operated key T or K in the NVM 104.

Further, the operation interface 20 has a second specific key (K5) different from the shortcut key K9 which is an example of the first specific key. When receiving an operation to the second specific key, and three-digit number is inputted by operation of the numeric keys T, the controller 100 reads the telephone number 44 associated with the three-digit number from the NVM 104 that stores the telephone numbers 44 in association with the three-digit numbers. Then, the controller 100 transmits image data to a destination indicated by the read telephone number 44.

According to the above configuration, the telephone number 44 can be read from the NVM 104 by operation of only the shortcut key K9 and numeric key T. Further, more telephone numbers 44 can be read from the NVM 104 by operation of only the second specific key different from the shortcut key K9 and the numeric key T. That is, the above configuration includes a telephone number reading method with excellent operability and a telephone number reading method capable of storing more telephone numbers 44 in the NVM 104, thereby improving user convenience.

The second specific key is the UP key K5 arranged in the operation interface 20 illustrated in FIG. 2. The controller 100 can display, on the display 40, the telephone number 44 inputted by operation of the direction key K and numeric keys T.

With the above configuration, the UP key K5 can be used as the second specific key, thus eliminating the need to prepare a dedicated key as the second specific key.

On the operation panel 10, the direction key K is arranged in the second arrangement space SP2 different from the first arrangement space SP1 in which the shortcut key K9, numeric keys T, and start key K10 are arranged.

When receiving the operation of the DOWN key K7 in a state that the telephone number 44 is displayed on the display 40, the controller 100 reads, from among the telephone numbers 44 stored in the NVM 104, a telephone number 44 not displayed on the display 40 and updates the display 40 to newly display the newly read telephone number 44. Then, when receiving the operation of the start key K10, the controller 100 transmits image data to the destination indicated by the telephone number 44 newly displayed.

With the above configuration, a user can transmit image data by operating only the shortcut key K9, numeric key T, and start key K10 which are arranged in the first arrangement space SP1 on the operation panel 10. Since the keys to be operated are collectively arranged in the first arrangement space SP1, the user can perform a smooth operation. Further, since the DOWN key K7 is arranged in the second arrangement space SP2 different from the first arrangement space SP1, this configuration can reduce the risk of the user's inadvertent operation of the DOWN key K7 to undesirably change the read telephone number 44, thereby improving user convenience.

Further, on the operation panel 10, the direction keys K are arranged in the second arrangement space SP2 different from the first arrangement space SP1 in which the shortcut key K9, numeric keys T, and start key K10 are arranged.

Further, when the telephone number 44 displayed on the display 40 is corrected by operation of the direction key K and the numeric keys T, the controller 100 transmits image data to a destination indicated by the corrected telephone number 44.

With the above configuration, a user can transmit image data by operating only the keys which are arranged in the first arrangement space SP1 on the operation panel 10. Since the keys to be operated are collectively arranged in the first arrangement space SP1, the user can perform a smooth operation. Further, since the direction keys K are arranged in the second arrangement space SP2 different from the first arrangement space SP1, this configuration can reduce the risk of the user's inadvertent operation of the direction key K to undesirably change the read telephone number 44, thereby improving user convenience.

Further, in the operation interface 20 illustrated in FIG. 2, the first arrangement space SP1 is adjacent to the second arrangement space SP2.

With the above configuration, a user can change the telephone number 44 and transmit image data by operating only the keys arranged in the first arrangement space SP1 on the operation panel 10 and the second arrangement space SP2 adjacent to the first arrangement space SP1. This improves user convenience.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image transmission apparatus comprising:
   a plurality of keys;
   a scanner configured to generate image data;
   a display;
   a memory; and
   a controller,
   wherein the plurality of keys includes a plurality of numeric keys and a first specific key,
   wherein the memory is capable of storing a plurality of telephone numbers associated with respective ones of the plurality of numeric keys,
   wherein the controller is capable of controlling the display to display a telephone number inputted via the plurality of numeric keys, and transmitting the image data generated by the scanner to a transmission destination indicated by the displayed telephone number,
   wherein the controller is configured to perform:
      in a case that an operation of the first specific key is received and an operation of one of the plurality of numeric keys, as an operated numeric key, is received, reading a telephone number associated with the operated numeric key from the memory, and transmitting the image data to a transmission destination indicated by the read telephone number; and
      in a case that a successive or simultaneous operation of the first specific key and one of the plurality of numeric keys, as the operated numeric key, is detected, and the operated numeric key is associated with no telephone number in the memory, storing a new telephone number to be associated with the operated numeric key which is currently associated with no telephone number in the memory.

2. The image transmission apparatus according to claim 1, wherein the first specific key is a dedicated key used to read the telephone number associated with the operated numeric key.

3. The image transmission apparatus according to claim 1, wherein the plurality of keys further includes a plurality of direction keys, and the new telephone number is input via two or more keys of the plurality of numeric keys and at least one of the plurality of direction keys,
wherein the controller is configured to further perform:
after the operation of the first specific key is received, the operation of the operated numeric key is received, and the telephone number associated with the operated numeric key is read from the memory, displaying the read telephone number on the display; and
in a case that an operation of a specific one of the plurality of direction keys is received while the display displays the read telephone number, reading another telephone number other than the currently-displayed telephone number from the memory, updating the display to newly display the another telephone number, and transmitting the image data to a transmission destination indicated by the newly-displayed another telephone number.

4. The image transmission apparatus according to claim 3, wherein the controller is configured to further perform:
each time an operation of the specific one of the plurality of direction keys is received while the display displays the read telephone number, reading another telephone number other than the currently-displayed telephone number from the memory, updating the display to newly display the read another telephone number, and transmitting the image data to a transmission destination indicated by the newly-displayed another telephone number.

5. The image transmission apparatus according to claim 1, wherein the plurality of keys further includes a plurality of direction keys,
wherein the controller is configured to further perform:
in a case that while a telephone number is displayed on the display, the displayed telephone number is edited via at least one of the plurality of numeric keys and at least one of the plurality of direction keys, transmitting the image data to a transmission destination indicated by the edited telephone number.

6. The image transmission apparatus according to claim 1, wherein the plurality of keys further includes a plurality of direction keys.

7. The image transmission apparatus according to claim 1, wherein the memory is capable of storing a plurality of telephone numbers associated with respective ones of a plurality of two-or-more-digit numbers each having two or more digits,
wherein the plurality of keys further includes a second specific key different from the first specific key,
wherein the controller is configured to further perform:
in a case that an operation of the second specific key is received and a two-or-more-digit number is inputted via two or more keys of the plurality of numeric keys, reading a telephone number associated with the inputted two-or-more-digit number from the memory, and transmitting the image data to a transmission destination indicated by the read telephone number.

8. The image transmission apparatus according to claim 7, wherein the plurality of keys further includes a plurality of direction keys,
wherein the second specific key is one of the plurality of direction keys,
wherein the controller is configured to further perform:
displaying a telephone number, which is inputted via at least two of the plurality of numeric keys and at least one of the plurality of direction keys, on the display.

9. The image transmission apparatus according to claim 1, further comprising:
an operation panel on which the plurality of keys is arranged,
wherein the plurality of keys further includes a plurality of direction keys and a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of the plurality of numeric keys and at least one of the plurality of direction keys;
starting transmitting the image data in response to an operation of the start key being received; and
in a case that an operation of a specific one of the plurality of direction keys is received while the display displays the read telephone number, reading another telephone number other than the currently-displayed telephone number from the memory, updating the display to newly display the another telephone number, and transmitting the image data to a transmission destination indicated by the newly-displayed another telephone number.

10. The image transmission apparatus according to claim 9, wherein the first arrangement space is adjacent to the second arrangement space.

11. The image transmission apparatus according to claim 1, further comprising:
an operation panel on which the plurality of keys is arranged,
wherein the plurality of keys further includes a plurality of direction keys and a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of the plurality of numeric keys and at least one of the plurality of direction keys;
starting transmitting the image data in response to an operation of the start key being received; and
in a case that a telephone number is displayed on the display and the displayed telephone number is edited via at least one of the plurality of numeric keys and at least one of the plurality of direction keys, transmitting the image data to a transmission destination indicated by the edited telephone number.

12. The image transmission apparatus according to claim 1, wherein the plurality of numeric keys is assigned to respective ones of a plurality of numerals different from each other, each numeric key having a display area to display the assigned numeral and being for receiving an input of the assigned numeral.

13. The image transmission apparatus according to claim 1, wherein the controller is configured to perform, in a case that the operation of the first specific key and the operation of one of the plurality of numeric keys, as the operated numeric key, are detected successively or simultaneously, the reading the telephone number associated with the operated numeric key from the memory, and the transmitting the image data to the transmission destination indicated by the read telephone number.

14. The image transmission apparatus according to claim 1, wherein the plurality of keys further includes a plurality of direction keys, and the new telephone number is input via two or more keys of the plurality of numeric keys and at least one of the plurality of direction keys,
wherein the controller is configured to further perform:
after the operation of the first specific key is received, the operation of the operated numeric key is received, and the telephone number associated with the operated numeric key is read from the memory, displaying the read telephone number on the display.

15. The image transmission apparatus according to claim 1, further comprising:
an operation panel on which the plurality of keys is arranged,
wherein the plurality of keys further includes a plurality of direction keys and a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of the plurality of numeric keys and at least one of the plurality of direction keys; and
starting transmitting the image data in response to an operation of the start key being received.

16. An image transmission apparatus comprising:
a plurality of keys;
a scanner configured to generate image data;
a display;
a memory; and
a controller,
wherein the plurality of keys includes a plurality of numeric keys, a plurality of direction keys, and a first specific key,
wherein the memory is capable of storing a plurality of telephone numbers associated with respective ones of the plurality of direction keys,
wherein the controller is capable of controlling the display to display a telephone number inputted via the plurality of numeric keys, and transmitting the image data generated by the scanner to a transmission destination indicated by the displayed telephone number,
wherein the controller is configured to perform:
in a case that an operation of the first specific key is received and an operation of one of the plurality of direction keys, as an operated direction key, is received, reading a telephone number associated with the operated direction key from the memory, and transmitting the image data to a transmission destination indicated by the read telephone number;
in a case that a new telephone number is inputted via two or more keys of the plurality of numeric keys and at least one of the plurality of direction keys, storing the new telephone number to be associated with one of the plurality of direction keys; and
after the operation of the first specific key is received, the operation of the operated direction key is received, and the telephone number associated with the operated direction key is read from the memory, displaying the read telephone number on the display.

17. The image transmission apparatus according to claim 16, wherein the first specific key is a dedicated key used to read the telephone number associated with the operated direction key.

18. The image transmission apparatus according to claim 16,
wherein the controller is configured to further perform:
in a case that an operation of a specific one of the plurality of direction keys is received while the display displays the read telephone number, reading another telephone number other than the currently-displayed telephone number from the memory, updating the display to newly display the another telephone number, and transmitting the image data to a transmission destination indicated by the newly-displayed another telephone number.

19. The image transmission apparatus according to claim 18, wherein the controller is configured to further perform:
each time an operation of the specific one of the plurality of direction keys is received while the display displays the read telephone number, reading another telephone number other than the currently-displayed telephone number from the memory, updating the display to newly display the read another telephone number, and transmitting the image data to a transmission destination indicated by the newly-displayed another telephone number.

20. The image transmission apparatus according to claim 16,
wherein the controller is configured to further perform:
in a case that a telephone number is displayed on the display and the displayed telephone number is edited via at least one of the plurality of numeric keys and at least one of the plurality of direction keys, transmitting the image data to a transmission destination indicated by the edited telephone number.

21. The image transmission apparatus according to claim 16,
wherein the controller is configured to perform:
in a case that the operation of the first specific key is received, an operation of a specific one of the plurality of direction keys, as the operated direction key, is received, the operated direction key is associated with no telephone number in the memory, and the new telephone number is input, storing the new telephone number to be associated with the operated direction key which is currently associated with no telephone number in the memory.

22. The image transmission apparatus according to claim 16, wherein the memory is capable of storing a plurality of telephone numbers associated with respective ones of a plurality of two-or-more-digit numbers each having two or more digits,
wherein the plurality of keys further includes a second specific key different from the first specific key,
wherein the controller is configured to further perform:

in a case that an operation of the second specific key is received and a two-or-more-digit number is inputted via two or more keys of the plurality of numeric keys, reading a telephone number associated with the inputted two-or-more-digit number from the memory, and transmitting the image data to a transmission destination indicated by the read telephone number.

23. The image transmission apparatus according to claim 22,
wherein the second specific key is one of the plurality of direction keys,
wherein the controller is configured to further perform:
displaying a telephone number, which is inputted via at least two of the plurality of numeric keys and at least one of the plurality of direction keys, on the display.

24. The image transmission apparatus according to claim 16, further comprising:
an operation panel on which the plurality of keys is arranged,
wherein the plurality of keys further includes a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of the plurality of numeric keys and at least one of the plurality of direction keys;
starting transmitting the image data in response to an operation of the start key being received; and
in a case that an operation of a specific one of the plurality of direction keys is received while the display displays the read telephone number, reading another telephone number other than the currently-displayed telephone number from the memory, updating the display to newly display the another telephone number, and transmitting the image data to a transmission destination indicated by the newly-displayed another telephone number.

25. The image transmission apparatus according to claim 24, wherein the first arrangement space is adjacent to the second arrangement space.

26. The image transmission apparatus according to claim 16, further comprising:
an operation panel on which the plurality of keys is arranged,
wherein the plurality of keys further includes a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of plurality of numeric keys and at least one of the plurality of direction keys;
starting transmitting the image data in response to an operation of the start key being received; and
in a case that while a telephone number is displayed on the display and the displayed telephone number is edited via at least one of the plurality of numeric keys and at least one of the plurality of direction keys, transmitting the image data to a transmission destination indicated by the edited telephone number.

27. The image transmission apparatus according to claim 16, wherein the plurality of direction keys is assigned to respective ones of a plurality of directions different from each other, each direction key having a display area to display the assigned direction and being for receiving an input to move a cursor displayed on the display to the assigned direction.

28. The image transmission apparatus according to claim 16, wherein the controller is configured to perform, in a case that the operation of the first specific key and the operation of one of the plurality of direction keys, as the operated direction key, are detected successively or simultaneously, the reading the telephone number associated with the operated direction key from the memory, and the transmitting the image data to the transmission destination indicated by the read telephone number.

29. The image transmission apparatus according to claim 16, wherein the first specific key or the one of the plurality of direction keys is operated successively or simultaneously before the storing is performed.

30. The image transmission apparatus according to claim 16, further comprising:
an operation panel on which the plurality of keys is arranged,
wherein the plurality of keys further includes a start key,
wherein the operation panel defines a first arrangement space and a second arrangement space different from the first arrangement space,
wherein the first specific key, the plurality of numeric keys, and the start key are arranged in the second arrangement space,
wherein the controller is configured to further perform:
displaying a telephone number inputted via two or more keys of the plurality of numeric keys and at least one of the plurality of direction keys; and
starting transmitting the image data in response to an operation of the start key being received.

* * * * *